United States Patent Office 3,325,544
Patented June 13, 1967

3,325,544
9-(2-AMINO-1-METHYLETHYL) FLUOREN-9-OL AND SALTS THEREOF
Robert B. Moffett, Kalamazoo, Mich., assignor to The Upjohn Company, Kalamazoo, Mich., a corporation of Delaware
No Drawing. Filed June 10, 1965, Ser. No. 463,052
3 Claims. (Cl. 260—570.8)

This invention relates to new and useful organic compounds and to a novel process for the preparation thereof, and more particularly to 9-(2-amino-1-methylethyl)fluoren-9-ols and the acid addition salts thereof.

The 9-(2-amino-1-methylethyl)fluoren-9-ols of the present invention are represented by the formula:

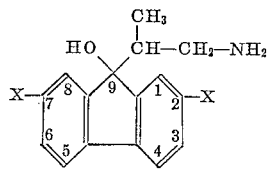

Formula I wherein X is a member selected from the group consisting of hydrogen, fluorine, chlorine, bromine, and methyl.

The compounds of Formula I are prepared by condensing propionitrile with a fluoren-9-one of the formula:

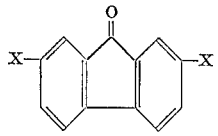

Formula II wherein X is as given above, to obtain a 9-hydroxy-α-methyl-fluorene-9-acetonitrile of the formula:

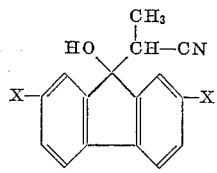

Formula III wherein X is as given above, and reducing the latter compound to obtain a compound of Formula I.

The starting fluoren-9-ones of Formula II, most of which are known, can be prepared by oxidizing the corresponding fluorenes, e.g.; by means of chromic acid in aqueous acetic acid.

In the first step of the process of this invention, propionitrile is condensed with a fluoren-9-one of Formula II in the presence of an alkaline condensing agent such as potassium hydroxide, lithium amide, sodium amide, diethylaminolithium, and the like, and a substantially anhydrous inert solvent, e.g., diethyl ether, diisopropyl ether, tetrahydrofuran, and the like. The resulting 9-hydroxy-α-methylfluorene-9-acetonitrile of Formula III can be isolated from the reaction mixture by conventional techniques, and purified if so desired. Ordinarily, however, purification is not necessary since the crude product can be used in the subsequent reduction step. If desired, the overall process can be further simplified by omitting the isolation of the Formula III nitrile, adding a reducing agent such as lithium aluminum hydride to the reaction mixture in which the nitrile was formed, and proceeding with the reduction of the nitrile.

In the second step of the process of the invention, the Formula III nitrile is reduced to the desired 9-(2-amino-1-methylethyl)fluoren-9-ol of Formula 1, employing for this purpose reducing agents effective for the conversion of nitriles to primary amines. For example, the nitrile can be reduced with lithium aluminum hydride as noted above, in the presence of an inert solvent such as diethyl ether, diisopropyl ether, tetrahydrofuran, and the like. When the reaction has been completed, the reaction mixture is decomposed, e.g., with aqueous sodium hydroxide, water, and the like, and the desired Formula I primary amine can be isolated and purified by conventional techniques, such as solvent extraction, solvent evaporation, crystallization, conversion to an addition salt, and the like.

Alternatively, the Formula III nitrile can be reduced to the Formula I primary amine by catalytic hydrogenation in the presence of a noble metal catalyst such as platinum or palladium or a base metal catalyst such as Raney nickel, and an inert solvent such as methanol, ethanol, ethyl acetate, and the like. The catalyst is then removed such as by filtration, and the amine can be isolated and purified, e.g., by evaporation of the filtrate and recrystallization of the residue.

Acid addition salts of compounds of Formula I can be prepared by neutralization of the free base with the appropriate amount of an inorganic or organic acid, examples of which are hydrochloric, hydrobromic, sulfuric, nitric, phosphoric, acetic, lactic, benzoic, salicylic, glycolic, succinic, tartaric, maleic, malic, pamoic, cylohexanesulfamic, citric and methanesulfonic acids, and like acids. The neutralization can be carried out by a variety of procedures known to the art to be generally useful for the preparation of amine acid addition salts. The choice of the most suitable procedure will depend on a variety of factors including convenience of operation, economic considerations, and particularly the solubility characteristics of the particular free base, the acid, and the acid addition salt. If the acid is soluble in water, the free base can be dissolved in water containing an equivalent amount of the acid, and thereafter, the water can be removed by evaporation; in some instances the salt precipitates from the aqueous solution, particularly when cooled, and evaporation is not necessary. If the acid is soluble in a relatively non-polar solvent, for example, diethyl ether or diisopropyl ether, separate solutions of the acid and free base in such a solvent can be mixed in equivalent amounts, whereupon the acid addition salt will usually precipitate because of its relatively low solubility in the non-polar solvent. Alternatively, the free base can be mixed with an equivalent amount of the acid in the presence of a solvent of moderate polarity, fo rexample, a lower alkanol, a lower alkanone, or a lower-alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt. These acid addition salts are useful for upgrading the free bases.

The compounds of Formula I in the free base form are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The fluosilicates of compounds of Formula I (prepared by neutralizing the free bases with fluosilicic acid) are useful as mothproofing agents according to U.S. Patents 1,915,334 and 2,075,359. The thiocyanates (prepared by neutralizing the free base with thiocyanic acid) can be condensed with formaldehyde to form resinous materials useful as pickling inhibitors according to U.S. Patents 2,425,320 and 2,606,155. The compounds of Formula I also form salts with penicillins. These salts have solubility characteristics which cause them to be useful in the isolation and purification of penicillins, particularly benzyl penicillin. Said salts can be formed either by neutralization of the free base form a compound of Formula I with the free acid form of a penicillin, or by a metathetical exchange of the anion of an acid addition salt of a compound of Formula I, for example, the chloride ion of a hydrochloride, with the anionic form of a penicillin.

The novel compounds of the present invention, including the free bases of Formula I and pharmacologically acceptable acid addition salts thereof, are useful pharmacological agents and can be used to produce stimulation of the central nervous system and tranquilizing effects. For example, 9-(2-amino-1-methylethyl)fluoren-9-ol hydrochloride produces CNS stimulation in intact mice at a dose, parenterally, of 30 mg./kg. ($LD_{50}$ 178 mg./kg.). Additionally, chloropromazine-like activity is shown at a dose of 80 mg./kg. (28% of the $LD_{50}$) in rats by the classical avoidance procedure.

The following examples are illustrative of the present invention and are not to be construed as limiting.

*Example 1.—9-(2-amino-1-methylethyl)fluoren-9-ol*

To a suspension of 4.5 g. (0.15 mole) of sodium amide in 100 ml. of anhydrous diethyl ether was added 18 g. (0.1 mole) of fluoren-9-one and 10 ml. (0.15 mole) of propionitrile. The mixture was stirred and maintained at reflux temperature for 2 hours, and then poured onto ice. After the ice had melted, the aqueous and organic layers were separated. The organic layer was washed successively with water, dilute hydrochloric acid, and water. The washed solution was dried with anhydrous sodium sulfate and evaporated to dryness, leaving 9-hydroxy-α-methyl-fluorene-9-acetonitrile as a gummy residue.

A solution of this gum in 400 ml. of anhydrous diethyl ether was added to a suspension of 4.2 g. (0.11 mole) of lithium aluminum hydride in 20 ml. of anhydrous diethyl ether. The mixture was maintained at reflux temperature for 4 hours. It was then cooled, and 4.2 ml. of water, 4.2 g. of 20% aqueous sodium hydroxide solution, and 2.6 ml. of water were successively added. The mixture was filtered and the filter cake was extracted first with diethyl ether and then with chloroform. The diethyl ether and chloroform solutions were separately extracted with dilute hydrochloric acid. The acid extracts were washed with diethyl ether and basified with sodium hydroxide, giving a white solid; M.P. 133–135° C. A sample was recrystallized from isopropyl alcohol, yielding white crystalline 9-(2-amino - 1 - methylethyl)fluoren - 9 - ol; M.P. 135.5–136.5° C.

*Analysis.*—Calcd. for $C_{16}H_{17}NO$: N, 5.85. Found: N, 5.67.

*Example 2.—9-(2-amino-1-methylethyl)fluoren-9-ol and hydrochloride thereof*

This example illustrates a simplified procedure in which the intermediate 9-hydroxy-α-methylfluorene-9-acetonitrile was not isolated.

A solution of 16.1 g. (0.22 mole) of diethylamine in 100 ml. of anhydrous diethyl ether was added dropwise with stirring during 30 minutes to 125 ml. of a hexane solution of butyllithium (0.20 mole), and the mixture was stirred for an additional 45 minutes. The mixture was cooled to about −10° C. (solid carbon dioxide-acetone bath) and a solution consisting of 30 g. (0.17 mole) of fluoren-9-one, 11 g. (0.20 mole) of propionitrile, and 250 ml. of anhydrous diethyl ether was added dropwise with stirring. The cooling bath was then removed, the mixture was allowed to warm to about 25° C., and was maintained at about 25° C. for 2 hours. Lithium aluminum hydride (8.4 g.; 0.23 mole) was added, and the mixture was stirred and maintained at reflux temperature for 4 hours. The mixture was then cooled, and 8.4 ml. of water, 8.4 ml. of 20% aqueous sodium hydroxide, and 5.2 ml. of water were successively added. The resulting precipitate was removed by filtration and extracted with two 100-ml. portions of warm chloroform. The combined filtrate and extracts were dried with anhydrous magnesium sulfate and evaporated to dryness under reduced pressure, to obtain 8.0 g. of crude 9-(2-amino-1-methylethyl)fluoren-9-ol as a residue. This material was dissolved in 25 ml. of anhydrous ethanol and 10 ml. of anhydrous ethanolic hydrogen chloride (2.6 N) was added at −5° C. The solution was concentrated at about 25° C. in a rotary evaporator and a small amount of anhydrous diethyl ether was added to the semi-solid residue. The resulting solid material was isolated and recrystallized from isopropyl alcohol to obtain 9-(2-amino-1-methylethyl)fluoren-9-ol hydrochloride; M.P. 232–234° C. (dec.).

*Analysis.*—Calcd. for $C_{16}H_{17}NO \cdot HCl$: C, 69.68; H, 6.58; Cl, 12.86; N, 5.08. Found: C, 69.68; H, 6.71; Cl, 12.79; N, 5.11.

*Example 3.—9-(2-amino-1-methylethyl)-2,7-dimethylfluoren-9-ol and hydrochloride thereof*

By substituting 2,7-dimethylfluoren-9-one for fluoren-9-one in the procedure of Example 2, 9-(2-amino-1-methylethyl)-2,7-dimethylfluoren-9-ol can be prepared, first as the free base and then as the hydrochloride.

*Example 4.—9-(2-amino-1-methylethyl)-2,7-dichlorofluoren-9-ol and hydrochloride thereof*

By substituting 2,7-dichlorofluoren-9-one for fluoren-9-one in the procedure of Example 2, 9-(2-amino-1-methylethyl)-2,7-dichlorofluoren-9-ol can be prepared, first as the free base and then as the hydrochloride.

*Example 5.—9-(2-amino-1-methylethyl)-2,7-dibromofluoren-9-ol and the hydrochloride thereof*

By substituting 2,7-dibromofluoren-9-one for fluoren-9-one in the procedure of Example 2, 9-(2-amino-1-methylethyl)-2,7-dibromofluoren-9-ol can be prepared, first as the free base and then as the hydrochloride.

*Example 6.—9-(2-amino-1-methylethyl)-2,7-difluorofluoren-9-ol and the hydrochloride thereof*

By substituting 2,7-difluorofluoren-9-one for fluoren-9-one in the procedure of Example 2, 9-(2-amino-1-methylethyl)-2,7-difluorofluoren-9-ol can be prepared, first as the free base and then as the hydrochloride.

The 2,7-difluorofluoren-9-one employed in Example 6 can be prepared by oxidizing 2,7-difluorofluorene with chromic acid in acetic acid.

Each of the free bases of the above examples can be converted to other acid addition salts, such as the hydrobromide, sulfate, nitrate, phosphate, acetate, lactate, benzoate, salicylate, glycolate, succinate, tartrate, maleate, malate, pamoate, cyclohexanesulfamate, citrate, and methanesulfonate, by neutralizing the free base with the appropriate acid as described above.

What is claimed is:
1. A compound selected from the group consisting of
(a) compounds of the formula:

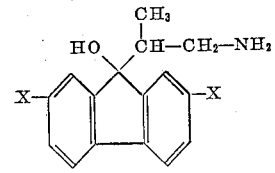

wherein X is a member selected from the group consisting of hydrogen, fluorine, chlorine, bromine, and methyl, and (b) acid addition salts thereof.

2. 9-(2-amino-1-methylethyl)fluoren-9-ol.

3. 9 - (2 - amino - 1 - methylethyl)fluoren - 9 - ol hydrochloride.

References Cited
UNITED STATES PATENTS

| | | |
|---|---|---|
| 2,461,038 | 2/1949 | Cusic. |
| 2,520,153 | 8/1950 | Lawson et al. |
| 3,054,822 | 9/1962 | Schon et al. _____ 260—570.5 X |

FOREIGN PATENTS

| | | |
|---|---|---|
| 224,084 | 9/1959 | Australia. |
| 811,659 | 4/1959 | Great Britain. |
| 1,150,976 | 7/1963 | Germany. |

OTHER REFERENCES

Bonvicino et al.: "Journal Organic Chemistry," vol. 26, pages 2388 and 92 (1961).

Kjaer et al.: "Acta Chemica Scand.," vol. 5, pages 1147 and 49 (1951), Lettre et al.

CHARLES B. PARKER, *Primary Examiner.*

R. V. HINES, *Assistant Examiner.*